Sept. 10, 1957     F. L. BAXTER, JR     2,805,738
CENTRIFUGAL GOVERNING APPARATUS
Filed Nov. 4, 1954
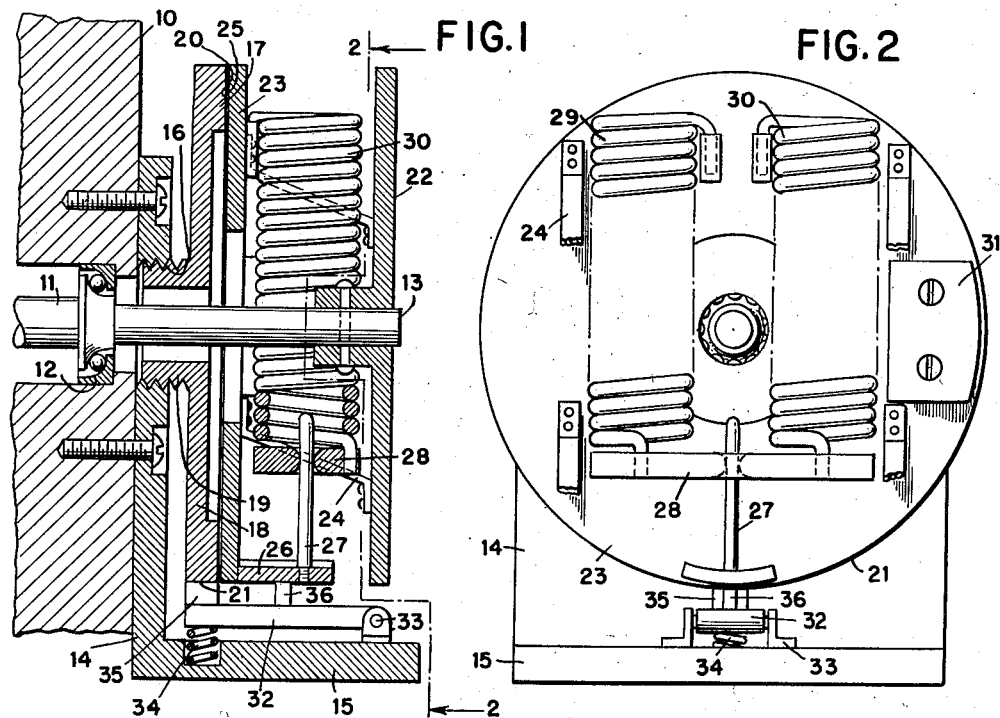
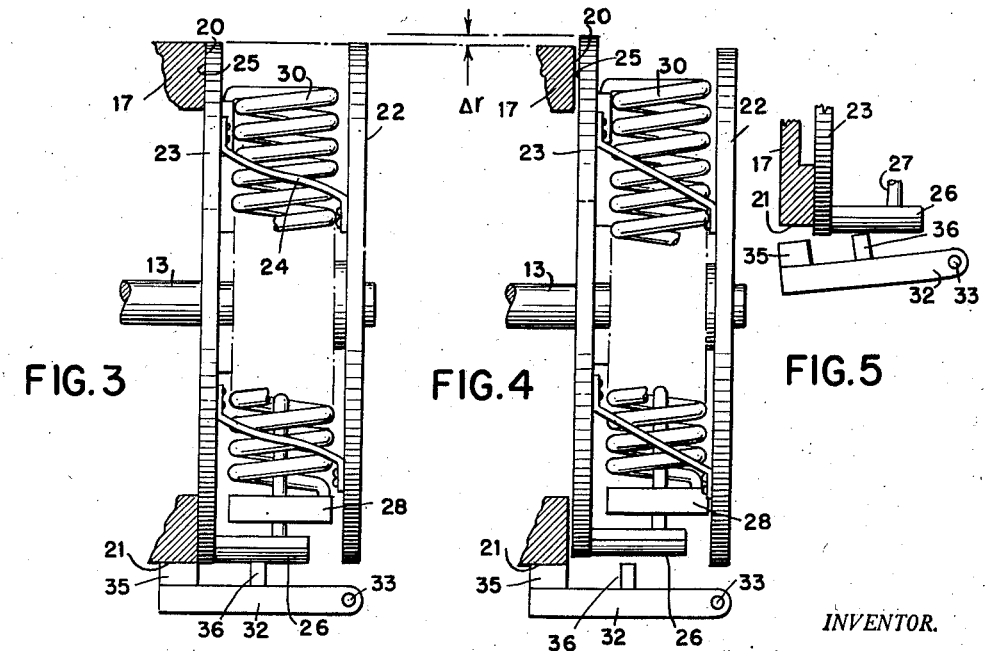
INVENTOR.
Frederic L. Baxter Jr.
BY
*Adams, Forward & McLean*
ATTORNEYS 2,805,738
CENTRIFUGAL GOVERNING APPARATUS

Frederic L. Baxter, Jr., Cos Cob, Conn., assignor, by mesne assignments, to Hartford Steel Ball Co., Inc., West Hartford, Conn., a corporation of Delaware Application November 4, 1954, Serial No. 466,766

14 Claims. (Cl. 188—187)

My invention relates to friction brake centrifugal governors and in particular provides a governor sometimes referred to as isochronous or astatic. In another aspect my invention provides a governor which is varistatic, that is, a governor which can be adjusted to provide a drooping or a rising characteristic or which can be adjusted to operate in an isochronous condition.

It has heretofore been established that a weight supported on a rotating shaft for displacement along a radial line rotating with the shaft can be made to store energy by attaching the weight to the shaft by means of a spring which biases the weight in static condition to a position centered on the axis of rotation of the shaft. For any such combination of spring and weight there exists a speed of rotation of the shaft in which the elastic and centrifugal forces acting upon the weight will be equal and opposite for all radial displacements of the weight within the elastic limits of the elastic device.
Thus:

(1) $$f_s = kr$$

where:
$f_s$ is the force exerted upon the mass by deformation of the elastic device,
$k$ is the elastic constant of the elastic device, and
$r$ is the radial displacement of the mass from the center of rotation;

(2) $$f_c = \omega^2 m r$$

where:
$f_c$ is the centrifugal force acting upon the mass,
$\omega$ is the speed of rotation, and
$m$ is the effective mass.

It will be observed that there exists a frequency $\omega_1$ at which:

(3) $$f_s = f_c$$

and consequently:

(4) $$kr = \omega_1^2 m r$$

or simplifying, dropping $r$:

(5) $$\omega_1 = \sqrt{\frac{k}{m}}$$

Equation 5 above defines the isochronous condition and demonstrates that at the isochronous speed, $\omega_1$, the radial displacement, $r$, at the weight does not enter into or affect the balance between the elastic and centrifugal forces acting on the mass. (It is also to be noted that Equation 5 would be the same as the usual equation for the resonant vibrational frequency of an elastically supported mass, without damping, if $\omega_1$ were converted from radians to cycles.) Because, at rotational speed $\omega_1$, the mass can assume any radial position while the two forces acting on it remain always equal and opposite, the elastic device can be used to store energy without a steady state change in speed. Thus, if the level of force or energy in the elastic device or the position of the mass is used to control the torque or power which drives the governor, to maintain an average equilibrium between the amount supplied and required, the energy storage ability can maintain equilibrium under transient conditions, and the average speed will be $\omega_1$, under all conditions within design limits.

In using the position of the mass or the force in the elastic device to control the torque supplied, no additional forces can be allowed to act on the mass, and no positional changes can be allowed to occur which will change the relation between elastic force and mass radius, or Equation 5 will not hold true—$\omega_1$ will not be constant, but will be affected by any control force or motion required or by the mass radius, and the governor speed regulation will suffer.

Such a tuned weight and spring combination have previously been utilized to provide a mechanical speed governor by mounting the weight and spring on a brake shoe which is radially displaceable with respect to the shaft and by employing a brake drum which contacts the brake shoe in a manner limiting the radial displacement of the brake shoe such that in the contact position the spring biases the weight in a static condition to a position centered on the axis of rotation of the shaft.

It has heretofore also been recognized that such a governor construction is unstable. Stability, it has been thought, is attained by loading the brake shoe with a weight fixed to the brake shoe which tends to throw the brake shoe into contact with the brake drum, that is, by making the brake shoe heavy on the side of braking action. It has further been recognized that some sort of elastic device, such as flat springs, must be employed to connect the weighted brake shoe to the rotating shaft to offset the excess braking force.

The theory underlying the use of the weighted brake shoe is that the unstable control action of an isochronous governor is in part based on the fact that a transient change in speed of rotation is necessary to start the radially displaceable weight moving to a new control radius and that such transient speed change, once the weight has started to move to a new displacement, tends to cause the weight to overshoot, thus producing a hunting effect and accompanying chatter which can build up to a destructive level. It has been thought that by weighting the brake shoe with a fixed weight independent of the radially displaceable weight a transient increase in rotational speed will cause a small but definite increase in braking force by increased centrifugal force developed in the weighted brake shoe before the radially displaceable weight has had time to increase the braking force and thus a force is provided which tends to damp the transient speed change. The flat springs provide an opposition to the centrifugal effect of the fixed weight which is not responsive to speed changes and thus provides in theory opposition to excess braking action at control speed.

Such a device has been heretofore constructed. It is, however, subject to certain disadvantages. A principal such disadvantage lies in the fact that the brake shoe and brake drum do not constantly remain in contact, however smoothly machined. The resulting brake separation, unless held to a minimum, tends to cause severe instability and chatter and to impair speed regulation. This disadvantage has heretofore required, even for partial correction, the use of a mechanical stop to limit severely the maximum possible brake separation to an amount just sufficient to allow free running up to control speed. The employment of such a stop, however, allows and in fact encourages the existence of a mean brake shoe position having a substantial clearance from the brake drum. Such clearance upsets the theoretical static position of the radially displaceable weight and consequently causes the control speed to vary unpredictably.

I have now discovered that instability and chatter in an isochronous governor are due partly to the fact that, as the brake shoe separates from the brake drum, the consequent change in radial displacement of the brake shoe results in a shift in the center of gravity of the brake shoe and parts supported on the brake shoe which produces a decrease in centrifugal force acting on the brake shoe and such decrease in centrifugal force tends to cause further brake separation. This tendency increases with increased brake separation and consequently is an unstable condition.

I have found that this condition can be obviated, and that brake separation, which also impairs accuracy, can be substantially minimized without the necessity of employing brake stops or similar devices.

I obtain these desirable results with a governor employing a brake shoe connected to a rotating shaft for outward radial displacement along a line rotating with the shaft. A brake drum is positioned to limit the outward radial displacement of the brake shoe. Springs or similar elastic devices are employed to oppose outward radial displacement of the brake shoe. A weight is mounted on the brake shoe for outward radial displacement with respect to the brake shoe in the same direction from the axis of rotation of the shaft as the brake shoe. A spring or other elastic device is connected between the radially displaceable weight and brake shoe to oppose outward radial displacement of the weight.

So far as I have described my governor, it is similar to the devices previously discussed and is capable of adjustment to maintain isochronous speed control by biasing the radially displaceable weight on the axis of rotation of the brake shoe when the brake shoe is in contact with the brake drum as described previously.

Instead of providing a weight fixed on the brake shoe to unbalance it on the side favoring brake shoe and brake drum contact, however, I arrange that the center of gravity of the brake shoe, including the spring and radially displaceable weight combination mounted on the brake shoe, lies approximately on the center of rotation of the brake shoe, or on a line through the center of rotation and perpendicular to the line of radial displacement of the brake shoe, when the radially displaceable weight is displaced slightly out from the center of rotation. I also provide a stop to limit inward displacement of the radially displaceable weight toward the axis of rotation at approximately the position in which the brake shoe is balanced. In this position the spring or other elastic device connecting the brake shoe and radially displaceable weight theoretically exerts force on the radially displaceable weight retaining it abutting the stop at speeds under control speed.

Also contrary to prior arrangements in which the springs connecting the rotating shaft and brake shoe have been heavily preloaded opposing brake shoe and drum contact, such springs or other elastic devices in my governor are relaxed at a minimum clearance between brake shoe and brake drum contact, preferably that clearance which will just permit free running up to control speed. These springs are made extremely stiff such that the force exerted by them opposing brake shoe and brake drum contact, when the brake shoe and brake drum are in contact and when the radially displaceable weight is at the minimum control radius it assumes at control speed, equals in magnitude the centrifugal force favoring brake shoe and brake drum contact developed at control speed because of the outward shift in the center of gravity of the brake shoe caused by movement of the radially displaceable weight from its position against the stop out to the minimum control radius.

I also provide that the shift in center of gravity of the brake shoe reflecting the change in position of the radially displaceable weight between the minimum control radius and the lesser radius at which the same weight abuts the stop limiting its inward movement substantially exceed the radial displacement of the brake shoe between the position in which it is in contact with the brake drum and the position it assumes when the springs connecting it to the rotating shaft are relaxed. As a corollary, therefore, the weight of all parts of the brake shoe, except the radially displaceable weight are preferably held to a bare minimum, so that the weight of the radially displaceable weight need not be unduly large.

As a consequence of the above arrangement, when the radially displaceable weight has moved out to the minimum control radius at which the centrifugal force at control speed acting upon the brake shoe favoring the brake shoe and drum contact equals the spring force opposing contact of brake shoe and brake drum, in other words when the radially displaceable weight has moved out to a position at control speed such that the brake shoe and drum surfaces are just in contact with no frictional drag between them, and at all greater control radii of the radially displaceable weight, the difference in centrifugal force exerted upon the brake shoe urging contact of brake shoe and brake drum when a clearance between brake shoe and brake drum occurs is relatively small compared to the difference in the force exerted by the supporting springs opposing such contact under the same change of brake shoe position. I thereby provide a net force acting on the brake shoe at control speed favoring brake contact which increases as a direct function of brake shoe and drum separation to oppose such separation and eliminate development of brake chatter and mean brake clearance.

Thus in the governor of my invention I accomplish simultaneously provision of a stabilizing unbalance to prevent overshooting and stabilization of brake shoe and drum contact position, obviating the development of mean brake clearance that has heretofore inherently accompanied the use of a stabilizing unbalance, by achieving such unbalance substantially by the control positions of the radially displaceable weight rather than by a weight positioned at a fixed radius and by employing supporting springs for the brake shoe having no preload, that is, supporting springs which are relaxed at a very small clearance. I eliminate the need for a stop to limit radial displacement of the brake shoe away from contact with the brake drum.

For a more complete understanding of my invention reference is made to the appended drawings in which:

Figure 1 is a sectional elevation of a governor constructed in accordance with my invention;

Figure 2 is a cross section of the governor shown in Figure 1 taken at line 2—2 in Figure 1;

Figure 3 is an exaggerated diagrammatic view similar to that shown in Figure 1 in which the governor is operating at control speed with contact of brake shoe and brake drum;

Figure 4 is an identical view to that shown in Figure 3 except that the brake shoe and brake drum are out of contact with an exaggerated clearance; and Figure 5 is a fragmentary exaggerated view of the governor illustrating operation of another part.

In the drawings the reference numeral 10 represents a fragmentary portion of the housing of a motor or other device, the speed of which is to be controlled. The motor is provided with a shaft 11 suitably mounted for rotation by a pair of bearings only one of which, represented by the reference numeral 12, is indicated. Such bearings are arranged to resist axial thrust and fix shaft 11 positively in an axial position. A stub shaft 13 extends from housing 10 as an integral extension of shaft 11.

Affixed to the end wall of housing 10 is a bracket 14 having an extension arm 15 which extends outwardly from housing 10. Bracket 14 is provided with an internally threaded opening 16 through which stub shaft 13 extends.

An annular brake drum 17 is integrally formed on annular disc 18 which is provided with a central opening and a threaded central projection 19 which threadedly engages threaded opening 16 of bracket 14. Brake drum 17 is provided with an annular friction surface 20 facing outwardly from housing 10 and is provided with a rough-surfaced outer rim 21.

Affixed to the end of stub shaft 13 and spaced beyond brake drum 17 is a support disc 22. Disc 22 supports an annular brake shoe 23 by means of four flat springs 24, each of which is affixed at one end to support 22 and at the other end to annular brake shoe 23. All four springs 24 are mounted inside disc 22 such that brake shoe 23 is positioned in the static condition illustrated in Figures 1 and 2 with a small clearance of its brake surface 25 from brake surface 20. Each of springs 24 as indicated in the drawings normally is at an angle, e. g., about 60°, with the confronting surfaces of disc 22 and brake shoe 23 to which it is secured. All four springs are aligned and spaced such that they provide a flexible link support which will permit annular brake shoe 23 to be brought axially into contact with annular brake drum 17 by a force acting against brake shoe 23 radially with respect to shaft 13.

On the side of brake shoe 23 against which such a force must act is positioned a small arm extension 26, affixed to which is a short radial guide rod 27 paralleling and spaced from the non-braking surface of brake shoe 23. Rod 27 carries in sliding engagement a weight 28. Weight 28 is thus radially displaceable with respect to shaft 13 and with respect to brake shoe 23 in the direction that brake shoe 23 is radially displaceable with respect to shaft 13.

A pair of parallel coil springs 29 and 30 are disposed about shaft 13. Coil 29 is secured at one end to weight 28 and at its other end is secured to the non-braking face of brake shoe 23. Coil 30 is similarly secured at one end to weight 28 on the opposite side of guide rod 27 and is similarly secured at its other end to the non-braking face of brake shoe 23. Both coils 29 and 30 are wound with a preload when their adjacent turns are touching. They therefore act as a stop limiting inward displacement of weight 28.

Insofar as the device has been described above, the center of gravity of brake shoe 23 and parts which move radially with it is adjusted to coincide with the axis of rotation when springs 24 are relaxed and weight 28 is in its innermost position, as shown in Figures 1 and 2. The preload on coil springs 29 and 30 is such that if the springs could be contracted to a position of no preload, they would bias weight 28 to the center of rotation of brake shoe 23 when its brake surface 25 is in contact with brake surface 20 of brake drum 17. The elastic constant of springs 29 and 30 is selected with reference to the mass of weight 28 such that the two springs and weight are tuned to a natural frequency corresponding to the desired speed of rotation, i. e., control speed, of the device enclosed within housing 10.

A second unbalance in the form of weight 31 is attached rigidly to brake shoe 23 at right angles to the line of radial displacement to provide a reaction to angular acceleration of the shaft being controlled before an effective change in angular velocity has occurred thus providing acceleration stability and greatly improving response of braking action to transient disturbances. The use of such a weight, however, is limited to situations where shaft 11 and consequently stub shaft 13 is to be rotated in one direction only, in the illustrated case, when rotation is counterclockwise as seen in Figure 2.

Mounted on bracket arm 15 is a lever 32 which is pivotally connected to bracket arm 15 near its outer extremity at 33 and which is spring-biased at its inner extremity by coil spring 34 to urge an inner lug 35 on lever arm 32 into contact with rough rim 21 of brake drum 17. A second lug 36 projecting from arm 32 between pivot end 33 and lug 35 is positioned to slide at its end in contact with the outer edge of arm 26 once each revolution. The bearing surfaces on arm 26 and lug 36 are of a hard material and are finely machined to provide a low coefficient of friction. The biasing of spring 34 is such that lug 35 grips rough rim 21 of brake drum 17 with sufficient force to prevent rotation of brake drum 17 under the heaviest braking conditions anticipated. Lug 36 is of a length such that it slides in contact within the outer surface of arm 26 without substantial pressure between the contacting surfaces when the radial displacement of brake shoe 23 is such that friction surface 25 is in contact with friction surface 20 of brake drum 17 and as thus determined the biased position of weight 28 is on the axis of rotation of shaft 13.

Figures 1 and 2 above assume a static condition in describing the positioning of the various elements. Thus there is a substantial clearance, e. g., about 0.005 inch, between friction surface 20 and friction surface 25, and similarly coil springs 29 and 30 are fully retracted. As the device to be governed is put into rotation, shaft 11 turns counterclockwise producing rotation of stub shaft 13 and consequently of disc 22, brake shoe 23, and the associated coil springs 29, 30 and weight 28. At speeds below control speed the spring forces acting on weight 28 exceed the centrifugal force developed by rotation of weight 28. Weight 28 consequently remains in the position shown in Figures 1 and 2. The balance of brake shoe 23 and affixed parts maintains the original brake separation up to control speed and springs 24 therefore remain relaxed up to control speed. At control speed the centrifugal force acting on weight 28 is slightly less than the spring force acting upon weight 28 because brake shoe 23 remains separated from brake drum 17. Weight 28, therefore, remains in its inner retracted position and hence the device momentarily overshoots control speed. This overshoot increases the centrifugal force acting on weight 28 to a point exceeding the spring force holding it in retracted position and weight 28 shoots outwardly to a control radius stretching springs 29 and 30. As the governor overshoots control speed and weight 28 slides out, the center of gravity of brake shoe 23 also shifts outward, and centrifugal force is developed which acts on brake shoe 23 to throw it into contact with brake drum 17 against the opposing action of springs 24. The shift in center of gravity must exceed the radial displacement of brake shoe 23 into contact with brake drum 17 from its position when springs 24 are relaxed. It can be, for example, 0.25 inch at minimum control radius.

The speed is then decreased by braking action to control speed. At control speed weight 28 readjusts to a mean control position at which braking force balances applied torque and at which the governor contains stored energy which will provide an increase in braking force for a transient increase in speed and a decrease in braking force with a transient decrease in speed by moving weight 28 to a greater or lesser radius, respectively. Such movement is aided by the stabilizing unbalance provided by the net effective unbalance in weight attached to brake shoe 23 on the contact movement side created by the movement of weight 28 to a control position and is further aided by the acceleration responsive unbalance provided by weight 31.

The braking surfaces, no matter how finely machined, are inherently sufficiently out of round and sufficiently rough to cause brake shoe 23 to move intermittently from contact position to a position of substantial clearance. Fundamentally my invention seeks to cause this action to be degenerative, and thus prevent sustained chatter, by applying added pressure tending to return the brake shoe into contact with the brake drum. As illustrative of this, assume the governor is operating at control speed with weight 28 positioned to provide a centrifugal force of 10 ounces acting on brake shoe 23 in the contact position. At the same time the effective loading of springs 24 opposing such contact is 8 ounces.

In such a case 2 ounces of net braking force are obtained (see Figure 3). If the brake surfaces are suddenly caused to clear each other by, for example, 0.0025 inch (see Figure 4), such clearance is accompanied by a radial displacement of brake shoe 23 decreasing the effective operating radius of the entire mass attached to brake shoe 23, as indicated in Figures 3 and 4 between arrows labeled Δr. This change in radius in the illustrated case causes the center of gravity of brake shoe 23 to shift inwardly 0.0025/tan 60° (approximate angle of springs 24), or 0.0021 inch, from its operating radius of 0.25 inch and consequently produces a decrease of centrifugal force acting on brake shoe 23 of approximately 0.10 ounce; that is, the centrifugal force urging brake shoe 23 into contact with brake drum 17 is decreased from 10 ounces to 9.90 ounces. At the same time, however, the pressure of springs 24 opposing contact of brake shoe 23 and brake drum 17 is changed from 8 ounces to 4 ounces. Thus a net force of 5.9 ounces urges return of contact between brake shoe 23 and brake drum 17. This force is greater than the force urging contact when the brake shoe and brake drum 17 are in contact, namely 2 ounces. Regenerative oscillation is thereby prevented and the need for a stop to prevent chatter is eliminated.

Brake drum and brake shoe wear are a major source of error in isochronous governors. Such wear changes the control speed and also is accompanied by a departure from isochronous speed control.

A further feature of the device described above is that it is self-adjusting to brake drum and brake shoe wear. Thus in Figure 5 there is illustrated a case in which brake shoe and brake drum wear have increased the radial displacement of brake shoe 23 to such an extent that, as arm 26 slides across the end of lug 36, lug 35 is removed from contact with rim 21 of brake drum 17. Braking thus produces a counterclockwise rotation of brake drum 17. The threaded engagement of drum 17 with bracket 14 is such that this rotation causes drum 17 to move axially toward brake shoe 23 until the wear has been taken up by return of brake shoe 23 to a displacement which will not release the frictional engagement between lug 35 and rim 21. Actually, of course, take-up action does not wait for a substantial brake wear as suggested in Figure 5, but is in extremely small increments at frequent intervals.

While I have described a governor adjusted to operate in an isochronous condition, that is, with the same control speed no matter how much applied torque varies within load handling capability of the governor, the same device can also be adjusted to provide either a "rising" or "drooping" applied torque vs. speed characteristic. This is simply accomplished by changing the theoretical zero biased position of weight 28 in static condition, for example, by changing the position at which springs 29 and 30 are connected to brake shoe 23. Whereas with weight 28 theoretically zero biased on the center of rotation an isochronous condition is maintained, if weight 28 is theoretically zero biased below the center of rotation as seen in the drawings, a drooping characteristic is obtained. On the other hand, if the weight is biased above the center of rotation as seen in the drawings, a rising characteristic is obtained.

In the preceding description of the drawings, I have described a particular governor construction which is designed to meet certain specifications. In obtaining the principles of my invention, however, other arrangements can be employed. Where extension of shaft stub 13 through the governor is not required, a single coil spring can be used in place of coils 29 and 30. This is a known expedient. Similarly flat springs 24 can be replaced by pivoted links and coil springs tending to oppose brake shoe and drum contact. Where the governor is to operate at a relatively high control speed, vibration caused by stabilizing unbalances can be balanced out by use of appropriate counterweights attached to the rigid structure, for example, disc 22. These and other expedients and variations in applying my invention are, of course, within the common skill in the art.

I claim:

1. A centrifugal governor for a rotatable shaft comprising, in combination, means forming a governor support for attachment to said shaft, said support having an axis of rotation coinciding with the axis of said shaft when attached thereto, a brake shoe, means mounting said shoe on said governor support for rotation with said shaft, said shoe being positioned by said mounting means with its center of gravity lying substantially on the axis of rotation of said governor support when said governor is at rest, said mounting means being arranged to permit movement of said shoe in a radial direction with respect to said support axis, said mounting means including a first resilient connection between said shoe and said support, a braking surface supported independently of said support and located to be engaged by said shoe upon outward movement thereof in said radial direction, said first resilient means being arranged to urge said shoe inwardly toward said support axis when said shoe engages said braking surface, a weight, a second resilient means connecting said weight to said shoe, guiding means associated with said weight and mounted on said shoe to confine the motion of said weight with respect to said shoe resulting from centrifugal force acting thereon to translation having a component in said radial direction, and means limiting the motion of said weight in said radial direction, the common center of gravity of said shoe, said weight, said second resilient means, and said guiding means when said governor is at rest also lying substantially on the axis of rotation of said governor support.

2. A centrifugal governor for a rotatable shaft comprising, in combination, means forming a governor support for attachment to said shaft, said support having an axis of rotation coinciding with the axis of said shaft when attached thereto, a brake shoe, means mounting said shoe on said governor support for rotation with said shaft, said mounting means being arranged to permit movement of said shoe in a radial direction with respect to said governor support axis, said mounting means including a first resilient connection between said shoe and said support, a braking surface supported independently of said governor support and located to be engaged by said shoe upon outward movement thereof in said radial direction, said first resilient means being arranged to urge said shoe inwardly toward said shaft when said shoe engages said braking surface, a weight, a second resilient means connecting said weight to said shoe, guiding means associated with said weight and mounted on said shoe to confine motion of said weight with respect to said shoe resulting from centrifugal force acting on said weight to translation having a component in said radial direction, and means limiting the motion of said weight in said radial direction, the ratio of the spring constant of said first resilient means to the mass of said shoe being greater than the ratio of the spring constant of said second resilient means to the mass of said weight.

3. A centrifugal governor for maintaining a rotatable shaft at a substantially constant designated speed comprising, in combination, means forming a governor support for attachment to said shaft, said governor support having an axis of rotation coincident with the axis of the shaft when mounted thereon, a brake shoe, means mounting said shoe on said governor support for rotation with said shaft, said shoe being positioned by said means with its center of gravity lying substantially on the axis of said governor support when said governor is at rest, said mounting means being arranged to permit movement of said shoe in a radial direction with respect to said governor support axis, and said mounting means including a first resilient connection between said shoe and said governor support, a braking surface supported independently of said shaft and located to be engaged by said shoe upon outward movement thereof, said first resilient means being arranged to urge said shoe inwardly towards said governor support axis when said shoe engages said braking surface, a weight, a second resilient means connecting said weight to said shoe, guiding means associated with said weight and mounted on said shoe to confine motion of said weight with respect to said shoe resulting from centrifugal force acting thereon to translation having a component in said radial direction, said weight adapted to move to at least a minimum operating radius when said governor is operating at said designated speed, and means limiting the motion of said weight in said radial direction, the mass of said shoe and said weight being so proportioned that the shift in the common center of gravity of said shoe and parts mounted thereon including said weight resulting from movement of said weight to said minimum operating radius is greater than the shift in said center of gravity resulting from outward radial movement of said shoe to engage said braking surface.

4. A centrifugal governor for maintaining a rotatable shaft at a substantially constant designated speed comprising, in combination, a base member for attachment to said shaft, said base member having an axis of rotation coincident with the axis of the shaft when mounted thereon, a brake shoe having symmetry about its center, a plurality of springs mounting said shoe on said base member in such manner that the center of said shoe lies substantially on the axis of said base member when said governor is at rest, whereby said shoe may be rotated by said shaft and whereby a radial force applied to said shoe will cause distortion of said springs to permit radial movement of said shoe, a brake drum positioned to engage said brake shoe upon radial movement thereof, spring means suspended at one end from said shoe and extending diametrically crosswise thereof, a weight connected to the free end of said last-mentioned spring, guiding means associated with said weight and supported by said shoe to confine the path of movement of said weight to translation with respect to said shoe in a direction substantially perpendicular to the axis of said base member, whereby centrifugal force acting on said weight as said base member is rotated at said designated speed is transmitted through said spring means to said shoe causing distortion of said plurality of springs and radial movement of said brake shoe to engage said brake drum.

5. A centrifugal governor for maintaining a rotatable shaft at a substantially constant designated speed comprising, in combination, a base member attached to said shaft, said base member having an axis of rotation coincident with the axis of the shaft when mounted thereon, a brake shoe, a plurality of substantially flat springs inclined at an angle to the axis of said base member mounting said shoe on said base member in such manner that the center of said shoe lies substantially on the axis of said base member when said governor is at rest, whereby said shoe is rotated by said base member and whereby a radial force applied to said shoe will cause distortion of said springs to permit axial and radial movement of said shoe with respect to said base member, a brake drum axially spaced from said brake shoe and independently supported in a position to engage said brake shoe upon axial and radial movement thereof, spring means having one end attached to said shoe at one edge thereof and extending diametrically crosswise of said shoe, a weight connected to the free end of said spring means, guiding means associated with said weight and supported by said shoe to confine the path of movement of said weight to translation with respect to said shoe in a direction substantially perpendicular to the axis of said base member, whereby centrifugal force acting on said weight as said base member is rotated at said designated speed causes outward movement of said weight and said force is transmitted through said spring means to said shoe causing distortion of said flat springs and axial and radial movement of said shoe to engage said brake drum.

6. The combination defined in claim 5 in which said shoe is positioned by said flat springs so that the center of gravity of said shoe lies substantially on the axis of rotation of said base member, and the common center of gravity of said shoe, said weight, said spring means, and said guiding means when said governor is at rest also lies substantially on the axis of rotation of said base member.

7. A centrifugal governor for maintaining a rotatable shaft at a substantially constant designated speed comprising, in combination, a base member for attachment to said shaft, said base member having an axis of rotation coincident with the axis of the shaft when mounted thereon, a brake shoe, a plurality of springs mounting said shoe on said base member in such manner that the center of said shoe lies substantially on the axis of said base member when said governor is at rest, whereby said shoe may be rotated by said shaft and whereby a radial force applied to said shoe will cause distortion of said springs to permit radial movement of said shoe, a brake drum positioned to engage said brake shoe upon radial movement thereof, spring means suspended at one end from said shoe and extending diametrically crosswise thereof, a weight connected to the free end of said last-mentioned spring, guiding means associated with said weight and supported by said shoe to confine the path of movement of said weight to translation with respect to said shoe in a direction substantially perpendicular to the axis of said base member, whereby centrifugal force acting on said weight as said base member is rotated at said designated speed is transmitted through said spring means to said shoe causing distortion of said plurality of springs and radial movement of said brake shoe to engage said brake drum, the ratio of the spring constant of said springs mounting said shoe on said base member to the mass of said shoe being substantially greater than the ratio of the spring constant of said spring means to the mass of said weight.

8. The combination defined in claim 5 in which the ratio of the spring constant of said flat springs to the mass of said shoe is greater than the ratio of the spring constant of said spring means to the mass of said weight.

9. The combination defined in claim 5 in which said shoe is positioned by said flat springs so that the center of gravity of said shoe lies substantially on the axis of rotation of said base member when the governor is at rest, said weight being adapted to move to at least a minimum operating radius when said governor is operating at said designated speed, and wherein the mass of said weight and said shoe are so proportioned that the shift in the common center of gravity of said shoe and parts mounted thereon, including said weight, resulting from movement of said weight to said minimum operating radius, is greater than the shift in said center of gravity resulting from outward radial movement of said shoe to engage said brake drum.

10. An isochronous centrifugal governor for maintaining a rotatable shaft at a substantially constant designated speed comprising, in combination, means forming a governor support for attachment to said shaft, said support having an axis of rotation coinciding with the axis of said shaft when attached thereto, a brake shoe, means mounting said shoe on said governor support for rotation with said shaft, said mounting means being arranged to permit movement of said shoe in a radial direction with respect to said governor support axis, said mounting means including a first resilient connection between said shoe and said support, a braking surface supported independently of said support and located to be engaged by said shoe upon outward movement thereof in said radial direction, said first resilient means being arranged to urge said shoe inwardly toward said shaft when said shoe engages said braking surface, a weight, a second resilient means connecting said weight to said shoe, guiding means associated with said weight and mounted on said shoe to confine motion of said weight with respect to said shoe resulting from centrifugal force acting thereon to translation having a component in said radial direction, said second resilient means positioning said weight on the axis of rotation of said governor support when said resilient means is completely unstressed, and a stop to prevent said weight from moving inwardly to the axis of rotation of said governor support, said stop and said guiding means limiting the motion of said weight in said radial direction, the ratio of the spring constant of said first resilient means to the mass of said shoe being greater than the ratio of the spring constant of said second resilient means to the mass of said weight.

11. An isochronous centrifugal governor for maintaining a rotatable shaft at a substantially constant designated speed comprising, in combination, a base member for attachment to said shaft, said base member having an axis of rotation coincident with the axis of the shaft when mounted thereon, a brake shoe having symmetry about its center, a plurality of springs mounting said shoe on said base member in such manner that the center of said shoe lies substantially on the axis of said base member when said governor is at rest, whereby said shoe may be rotated by said shaft and whereby a radial force applied to said shoe will cause distortion of said springs to permit radial movement of said shoe, a brake drum positioned to engage said brake shoe upon radial movement thereof, spring means suspended at one end from said shoe and extending diametrically crosswise thereof, a weight connected to the free end of said spring means, said spring means adapted to position said weight on the axis of rotation of said base member when said spring means is completely unstressed, a stop to prevent said weight from moving inwardly to the axis of rotation of said base member, and guiding means associated with said weight and supported by said shoe to confine the path of movement of said weight to translation with respect to said shoe in a direction substantially perpendicular to the axis of said base member, whereby centrifugal force acting on said weight as said shaft is rotated at said designated speed is transmitted through said spring means to said shoe causing distortion of said plurality of springs and radial movement of said brake shoe to engage said brake drum.

12. An isochronous centrifugal governor for maintaining a rotatable shaft at a substantially constant designated speed comprising, in combination, a base member for attachment to said shaft, said base member having an axis of rotation coincident with the axis of the shaft when mounted thereon, a brake shoe, a plurality of substantially flat springs inclined at an angle to the axis of said base member mounting said shoe on said base member with the center of said shoe lying substantially on the axis of said base member when said governer is at rest, whereby said shoe is rotated by said base member and whereby a radial force applied to said shoe will cause distortion of said springs to permit axial and radial movement of said shoe with respect to said base member, a brake drum axially spaced from said brake shoe and independently supported in a position to engage said brake shoe upon axial and radial movement thereof, spring means having one end attached to said shoe substantially adjacent one edge thereof and extending diametrically crosswise of said shoe, a weight connected to the free end of said spring means, said spring means adapted to position said weight on the axis of rotation of said base member when said spring means is completely unstressed, a stop to prevent said weight from moving inwardly to the axis of rotation of said governor support, and guiding means associated with said weight and supported by said shoe to confine the path of movement of said weight to translation with respect to said shoe in a direction substantially perpendicular to the axis of said base member, whereby centrifugal force acting on said weight as said base member is rotated at said designated speed causes outward movement of said weight and said force is transmitted through said spring means to said shoe causing distortion of said flat springs and axial and radial movement of said shoe to engage said brake drum.

13. The combination defined in claim 12 in which the ratio of the spring constant of said flat springs to the mass of said shoe is greater than the ratio of the spring constant of said spring means to the mass of said weight.

14. The combination defined in claim 5 which includes means for automatically adjusting the position of said drum to compensate for wear between the engaging surfaces of said shoe and said drum.

References Cited in the file of this patent

UNITED STATES PATENTS 2,742,983     Baxter, Jr. _____ Apr. 24, 1956